United States Patent
Colmerauer et al.

(10) Patent No.: US 9,386,784 B2
(45) Date of Patent: Jul. 12, 2016

(54) METHOD AND SYSTEM FOR ENTRAPPING PRESSURIZED GAS IN POWDERED FOOD OR BEVERAGE PRODUCTS

(75) Inventors: Aaron R. Colmerauer, Milwaukee, WI (US); Vijay K. Arora, Lake Forest, IL (US); Gerald Olean Fountain, Wilmette, IL (US); Philip James Oxford, Toronto, CA (US); Evan J. Turek, Cary, NC (US); Bary Lyn Zeller, Glenview, IL (US)

(73) Assignee: Intercontinental Great Brands LLC, East Hannover, NJ (US)

( * ) Notice: Subject to any disclaimer, the term of this patent is extended or adjusted under 35 U.S.C. 154(b) by 244 days.

(21) Appl. No.: 13/885,970

(22) PCT Filed: Nov. 14, 2011

(86) PCT No.: PCT/US2011/060586
§ 371 (c)(1),
(2), (4) Date: May 8, 2014

(87) PCT Pub. No.: WO2012/068012
PCT Pub. Date: May 24, 2012

(65) Prior Publication Data
US 2015/0017298 A1 Jan. 15, 2015

Related U.S. Application Data

(60) Provisional application No. 61/414,753, filed on Nov. 17, 2010.

(51) Int. Cl.
*A23L 2/40* (2006.01)
*A23L 1/00* (2006.01)
(Continued)

(52) U.S. Cl.
CPC .............. *A23L 1/0035* (2013.01); *A23C 9/1524* (2013.01); *A23F 5/36* (2013.01); *A23F 5/42* (2013.01);
(Continued)

(58) Field of Classification Search
CPC ...... A23G 2220/02; A23G 9/46; A23G 9/152; A23G 9/52; A23C 1/14–1/16; A23C 9/1524; A23C 9/18; A23C 13/125; A23C 2210/15; A23C 2240/20; A23C 2260/20; A23C 11/00; A23L 1/0097; A23L 1/19–1/196; A23L 1/40; A23L 2/39; A23L 2/40; A23L 2/54; A23L 3/52; A23L 1/0035–1/0041; A23L 1/0522; A23L 1/09; A23F 5/42; A23F 5/36; A23V 2002/00; A23V 2200/224; A23V 2200/226; A23V 2250/124; A23V 2250/1628; A23V 2250/5114; A23V 2250/5118
USPC .......... 426/520, 524, 564–572, 312, 465, 468
See application file for complete search history.

(56) References Cited

U.S. PATENT DOCUMENTS 2,595,574 A    5/1952  Grossman
2,638,837 A *  5/1953  Talmey ................. A23L 1/0121
                                                          34/168

(Continued)

FOREIGN PATENT DOCUMENTS

EP    0796562 A2    9/1997
EP    1557091 A1    7/2000
(Continued)

OTHER PUBLICATIONS

International Search Report and Written Opinion for PCT/US2011/060586 issued Mar. 15, 1012.

*Primary Examiner* — Drew Becker
(74) *Attorney, Agent, or Firm* — Fitch, Even, Tabin & Flanney LLP

(57) ABSTRACT

Methods and systems for continuously producing foaming compositions from powders, granules, and/or particulate are provided and/or powders, granules, and/or particulates that contains high pressure gas. The methods and systems are configured to reduce energy costs and overall processing time and, thus, provide advantages over the prior batch processes that have lengthy temperature ramp-up and cool-down times due to the shortcomings of using a large pressure vessel.

19 Claims, 5 Drawing Sheets

(51) Int. Cl.
   *A23G 9/46*    (2006.01)
   *A23C 9/152*   (2006.01)
   *A23G 9/52*    (2006.01)
   *A23F 5/36*    (2006.01)
   *A23F 5/42*    (2006.01)
   *A23L 1/0522*  (2006.01)
   *A23L 1/09*    (2006.01)

(52) U.S. Cl.
   CPC .. *A23G 9/46* (2013.01); *A23G 9/52* (2013.01); *A23L 1/0097* (2013.01); *A23L 1/0522* (2013.01); *A23L 1/09* (2013.01); *A23L 2/40* (2013.01); *A23C 2210/15* (2013.01); *A23C 2240/20* (2013.01); *A23C 2260/20* (2013.01); *A23G 2220/02* (2013.01); *A23V 2002/00* (2013.01)

(56) References Cited

U.S. PATENT DOCUMENTS

| | | | |
|---|---|---|---|
| 3,010,802 A   | 11/1961 | Schenk et al. | |
| 3,101,995 A * | 8/1963  | Beauvais | A23L 3/001 422/297 |
| 3,255,690 A * | 6/1966  | Schack | A23L 3/06 426/399 |
| 3,368,904 A * | 2/1968  | Young | C08B 30/12 426/463 |
| 3,955,486 A * | 5/1976  | Strommer | A23J 3/26 406/64 |
| 4,196,225 A * | 4/1980  | Mencacci | A23L 3/003 426/233 |
| 4,255,459 A * | 3/1981  | Glen | A23B 4/0053 426/510 |
| 4,262,029 A * | 4/1981  | Kleiner | A23G 3/0294 264/138 |
| 5,165,948 A * | 11/1992 | Thomas | A23C 13/125 426/242 |
| 5,523,053 A * | 6/1996  | Dudek | A23B 7/0053 34/171 |
| 5,721,003 A   | 2/1998  | Zeller | |
| 5,750,178 A * | 5/1998  | Cheng | A23F 5/486 426/388 |
| 6,090,430 A * | 7/2000  | Mochizuki | A23G 3/0221 426/474 |
| 6,168,819 B1  | 1/2001  | Zeller et al. | |
| 6,713,113 B2  | 3/2004  | Bisperink et al. | |
| 6,910,882 B2  | 6/2005  | Miller et al. | |
| 6,994,016 B1  | 2/2006  | Bunker et al. | |
| 7,534,461 B2  | 5/2009  | Zeller et al. | |
| 7,713,565 B2 * | 5/2010 | Zeller | A23F 5/36 426/445 |
| 7,736,683 B2  | 6/2010  | Zeller et al. | |
| 2003/0113414 A1 * | 6/2003 | Nolfi, Jr. | B65B 55/02 426/106 |
| 2006/0040023 A1 * | 2/2006 | Zeller | A23C 11/00 426/438 |
| 2006/0040033 A1 * | 2/2006 | Zeller | A23C 11/08 426/564 |
| 2006/0110516 A1 * | 5/2006 | Holtus | A23C 11/00 426/569 |
| 2008/0047160 A1 | 2/2008 | Vives | |
| 2008/0160139 A1 * | 7/2008 | Imison | A23F 5/42 426/96 |
| 2010/0178401 A1 * | 7/2010 | Van Appeldoorn | A23L 3/0155 426/392 |
| 2010/0278995 A1 * | 11/2010 | Boehm | A23C 11/00 426/590 |
| 2011/0014343 A1 * | 1/2011 | Jordan | A23L 1/0026 426/512 |
| 2012/0021115 A1 * | 1/2012 | Boehm | A23F 5/38 426/590 |
| 2012/0121789 A1 * | 5/2012 | Briend | A23F 5/38 426/590 |

FOREIGN PATENT DOCUMENTS

| | | |
|---|---|---|
| EP | 1042960 A2   | 11/2000 |
| EP | 1074181      | 2/2001  |
| EP | 1074181 A1   | 2/2001  |
| EP | 1160198 A1   | 5/2001  |
| EP | 1206193 A1   | 5/2002  |
| EP | 1349460 A1   | 10/2003 |
| EP | 1627568      | 2/2006  |
| EP | 1627568 A1   | 2/2006  |
| EP | 1627572      | 2/2006  |
| EP | 1627572 A1   | 2/2006  |
| EP | 2025238 A1   | 2/2009  |
| WO | 0108504 A1   | 2/2001  |
| WO | 0237979 A2   | 5/2002  |
| WO | 02062152     | 8/2002  |
| WO | 02062152 A1  | 8/2002  |
| WO | 2004019699   | 3/2004  |
| WO | 2004019699 A1 | 3/2004 |
| WO | 2006023565 A1 | 3/2006 |

* cited by examiner

METHOD AND SYSTEM FOR ENTRAPPING PRESSURIZED GAS IN POWDERED FOOD OR BEVERAGE PRODUCTS

CROSS-REFERENCE TO RELATED APPLICATION

This application is a U.S. national phase application of International Application No. PCT/US2011/060586, filed Nov. 14, 2011, designating the United States, which claims the benefit of U.S. Provisional Application Ser. No. 61/414,753 filed Nov. 17, 2010, both of which are incorporated herein by reference in their entirety.

FIELD

The field relates to a foaming composition and a method and system of making a foaming composition.

BACKGROUND

Food or beverage products that contain froth or foam are popular with consumers. For example, both hot and cold beverages, such as cappuccino, milkshakes, fruit-flavored drinks, and the like, may be prepared to have froth or foam. Recently, consumers increasingly prefer instant food and beverage products because of the convenience they provide. Such instant food and beverage products typically include a soluble powdered or granular food product that is dissolvable or dispensable in water or other fluid medium to form food or beverage products that may be consumed.

Recent advances have provided methods and equipment for entrapping pressurized gases within internal voids of the powdered or granular food and beverage products. In this manner, upon dissolving or dispensing the food or beverage product in fluid medium, the pressurized gas is released forming a foam or froth. Thus, a frothy or foamy food or beverage can be prepared from the instant product.

Current methods to prepare such powders may include a base product that has been pretreated to form a powder having internal voids. For example, the base product may be a carbohydrate powder that is prepared using gas-injected spray drying. The powder may be formed by spray drying a solution of the beverage product while injecting small gas bubbles into the solution stream to create a powder with internal voids.

In order to maximize the amount of foam that is created when the food or beverage powder is combined with fluid, the powder can be subjected to a pressurization process to entrap pressurized gas within the internal voids. The base powder substance is first placed into a batch vessel that is capable of withstanding relatively high temperature and pressure variations and the vessel is sealed to the external atmosphere. The vessel is next pressurized and heated by injecting pressurized inert gas into the vessel and applying heat to the walls of the vessel.

After heating, the vessel is usually cooled by cooling the outer walls to slowly decrease the temperature of the powder from the heated temperature to a cooling temperature. The vessel is typically slowly cooled to ensure that it is not damaged due to a rapid change in temperature which could otherwise create thermal stresses in the vessel material. The temperature of the powder is usually held at the cooling temperature for an amount of time so that the powder particles become less permeable to the flow of gas. Once the powder is cooled, while still under pressure, the gas is sealed in the particle voids. Finally, the vessel is de-pressurized.

While previous methods are generally sufficient for forming powdered and granular food and beverage products with entrapped pressurized gas, they do present some shortcomings. For example, the process time for a single batch of powder within a vessel in the prior methods is relatively high due, in part, to the lengthy time required to pressurize, heat, cool, and de-pressurize the vessel. For the same reason, the energy requirements for each batch is high due to the significant amount of energy consumed each time the vessel is heated and subsequently cooled.

DETAILED DESCRIPTION OF THE PREFERRED EMBODIMENTS

Figure 1:
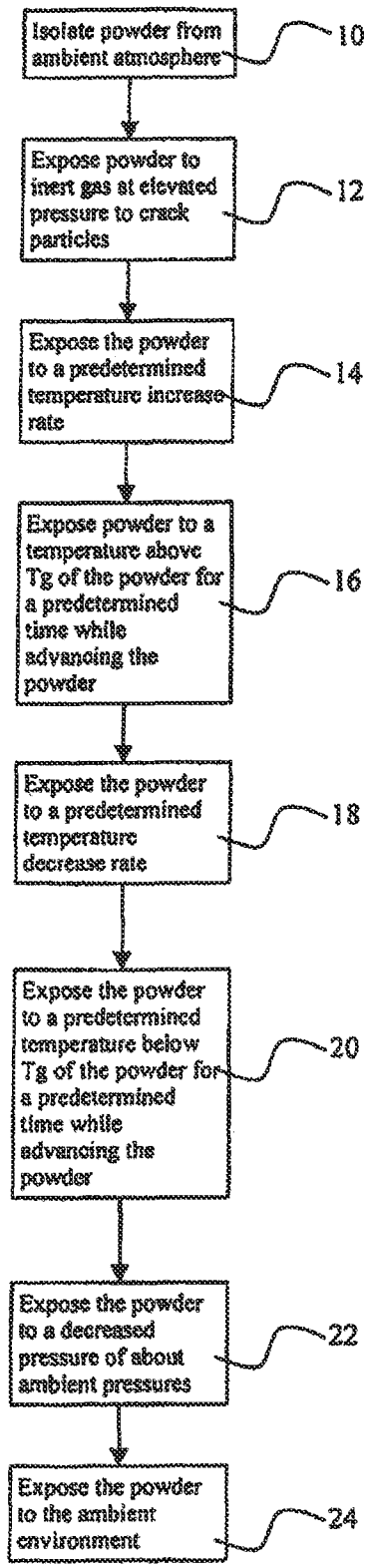
FIG. 1 is a flowchart of an exemplary method for entrapping pressurized gas within powdered or granular beverages or food products according.

Methods and systems for continuously producing foaming compositions from powders, granules, and/or particulate are provided and/or powders, granules, and/or particulates that contains high pressure gas. The methods and systems are configured to reduce energy costs and overall processing time and, thus, provide advantages over the prior batch processes that have lengthy temperature ramp-up and cool-down times due to the shortcomings of using a large pressure vessel.

In one aspect, the methods described herein reduce the temperature and pressure requirements of entrapping pressurized gas in voids of the particulate by introducing the particulate into a steady-state, continuous process in which the powder, granules, and/or particulate is exposed to a rapid thermal differential rate or thermal rate-of-change upon being introduced to heating and cooling phases, which operate at a steady state without lengthy heat-up and cool down periods. The heating and cooling phases in the continuous, steady-state process have a distinct separation therebetween to minimize and, in some cases, prevent thermal migration between these two zones. In another aspect, the steady-state, continuous methods use controlled air lock mechanisms having a surge capacity and gas venting rate sized and effective to pre-pressurize the powder, granules, and/or particulate to allow continuous dosing thereof into the steady-state, continuous process at high entrapment pressures as well as allow for a continuous de-pressurization for releasing the powder, granules, and/or particulate from the process. In some approaches, gas is shared between pressurization and de-pressurization zones to reduce overall gas consumption in the system.

Exemplary methods and systems are disclosed for entrapping pressurized gas within internal voids of a powder, such as a powdered, granular, and/or particulate food or beverage product, in a continuous or semi-continuous process. By one approach, the base powder is pre-treated to create internal voids within the powder, for example, by spray drying solutions containing dispersed gas bubbles or other processing methods, within which pressurized gas may be subsequently entrapped by the present methods. By another approach, the methods described herein are suitable for entrapping pressurized gas within the internal voids of powdered beverage products or other porous food powders such as carbohydrates powders, protein powders, coffee, tea, cocoa, or fruit-flavored drinks, or powdered food products such as an instant dessert product, instant cheese product, instant cereal product, instant soup product, and an instant topping product. By another approach, the porous food powders may be one or more of protein-free, carbohydrate-free, or fat-free. The pressures of the continuous processes herein provide gas at about 20 to about 3100 psi (in some cases, about 145 psi to about 3100 psi, and in other cases, about 145 to about 1100 psi) effective to continuously entrap gas into the powder so that upon dissolving the powders in water or another fluid to form a beverage product, the gas is released to form a foam or froth with good stability.

The term entrapped gas as used herein generally means gas that is present in the internal voids of a powder structure and is not able to leave this structure without opening the powder structure. Gases that can suitably be used according to the present invention may include nitrogen, argon, carbon dioxide, nitrous oxide, air, or other gases, or a mixture thereof. In one approach nitrogen gas is used, but any other food grade gas can be used to apply gas pressure to the powder.

The term powder, particle, particulate, or granule are used interchangeably and, as used herein, generally refers to any type of powdered or granular food or beverage product that has a glass transition temperature and includes or is capable of including internal voids within the powder structure and capable of entrapping pressurized gases, which may be formed by pre-treating the powder by spray-drying, gas-injected spray-drying, freeze-drying, or other suitable techniques.

The glass transition temperature (Tg) of the powder is a second-order phase change characterized by the transformation of the powder from a rigid glassy solid state to a softened rubbery solid state. In general, gas solubilities and diffusion rates are higher in materials at or above the glass transition temperature. The glass transition temperature is dependent upon chemical composition and moisture level and in general, lower average molecular weight and/or higher moisture will lower gas transition temperature.

The heat input required to process the powder herein generally refers to the total energy required per kilogram of powder and generally includes the sum of the energy to heat the powder above its Tg, the energy to heat the equipment, the energy to heat the gas, and the heat loss from the equipment during heating. The methods described herein allow a total energy savings over a batch system of about 50 to about 80 percent less heat input per kilogram of powder.

Turning to more of the specifics of the method and first referring to FIG. 1, an exemplary method for continuously entrapping pressurized gas within internal voids of a powder is provided. First, a base powder is substantially isolated at step 10 from ambient conditions for pre-pressurization. The isolated powder is then exposed to an elevated first pressure at step 12 effective to cause, in some cases, initial particle cracking of the powder. In this step, cracks, pores or passageways may be formed in particles that directly or indirectly connect the particle surface, and the surrounding atmosphere, to any internal voids initially present in the powder, which more effectively allow the pressurized gas to permeate into the internal voids. Some internal voids may be directly connected to the cracked particle surface, while other internal voids may be connected to internal voids connected to the cracked particle surface to indirectly contact them to the cracked particle surface. In one approach, greater than one-third, greater than one-half, or greater than two-thirds, the internal void volume of the base powder is directly or indirectly connected to the particle surface after cracking and before the powder temperature reaches its Tg during subsequent heating. The internal void volume of the base powder, or processed powder containing entrapped pressurized gas, can be measured using any suitable method, such as by using a gas pycnometer according to methods described in the prior art. Some powders, such as freeze-dried coffee granules, are inherently porous and contain pores and passageways that connect internal voids to the particle surface and therefore do not require cracking by contact with pressurized gas during the present process. Most spray-dried particles are not inherently porous and therefore require cracking during the present process to increase the amount of pressurized gas that can be entrapped in such powders. The pressures applied in this initial pressurizing phase in one approach are between about 20 and 3100 psi. Isolating and pressurizing the powder pursuant to step 10 and step 12 allows the pressure in subsequent steps to remain at a constant, steady-state throughout the apparatus and method without having to pressurize and de-pressurize an entire vessel for each cycle as was required in the prior methods.

Next, the powder is exposed to an environment creating a rapid thermal rate-of-change as it enters a steady-state continuous heating phase to quickly raise the temperature of the powder above its glass transition temperature (Tg). The temperature increase rate on entry to this phase is preferably relatively large and relatively fast so that the temperature is quickly increased above the Tg. In this regard, the powder is exposed to a step increase in temperature and is quickly exposed to the heating temperature above the Tg. It has been found that heating the powder below the Tg does not sufficiently allow the gas to permeate into the internal voids to increase the entrapped gas content and foaming capacity of the processed powder. Thus, the rapid increase in temperature to the heating temperature according to the present methods advantageously decreases the dwell time required for the heating process over prior methods by avoiding the time otherwise necessary to slowly preheat a vessel to the powder Tg. In one approach, the rapid thermal differential rate or rate-of-change the powder is subjected to upon entry into the heating phase is at least about 30° C./sec. According to another approach, the rate of temperature increase the powder is subjected to is between about 30° C. and about 300° C./sec. Thus, the powder is exposed to rapidly increasing temperature rather than a slow ramp up temperature commonly found in a batch process. By comparison, the warm-up period for a typical batch process may be about 1.5° C./minute, which can take up to about 40 to 50 minutes, or longer, for the particulate in a common batch process to experience the same temperature differential found in the present continuous process.

The powder is then exposed 16 to a heating temperature above the Tg for an effective amount of time to entrap the pressurized gas in the particle, such as in the voids, cracks, and the like. By one approach, the amount of time is sufficient to allow the powder material to transition to its rubbery state so that the solid phase of the powder becomes more permeable to gases flowing through the powder and so that cracks and pores either inherently present in the particles or formed during contacting the powder with pressurized gas, become closed to entrap pressurized gas in the internal voids present in the particles. To this end, during step 16, the pressure is maintained at the elevated pressure and the powder is exposed to pressurized gas to be entrapped. Thus, during this step, the pressurized gas is able to penetrate the powder and enter the internal voids. The predetermined amount of time or residence time is selected so that a desired amount of the pressurized gas enters the internal voids of the powder and is retained in the voids. In one approach, the residence time is between about 1 and 40 min. In another approach, the residence time is between about 6 and 20 min. In one approach, a maximum gas entrapment in ml/g is obtained with a residence time in the heating zone from about 15 to about 30 minutes (in some cases about 15 to about 25 minutes, and in other cases about 20 minutes) and at temperatures of about 120° C. or less (and in some cases at a temperature of about 100 to about 110° C., and in other cases about 10° C.). In some cases, levels of gas entrapment of about 10 to about 13 ml/g can be obtained with such residence times and temperatures. In some cases, temperatures above 120° C. result in powder agglomeration and, in some cases, temperatures above 130° C. can result in coffee powder melting to the walls of the equipment.

During the heating phase of step 16, as the powder is being heated above its Tg, the powder is continuously moved, advanced, and/or agitated to avoid or reduce agglomeration of powder particles and sticking of the powder. In one approach, the powder movement is effected by continuously advancing the powder through a heating zone during heating thereof via an auger or other continuous screw or transport mechanism. Such a method is preferred over the use of a continuously advancing conveyor belt, because an auger or screw generally provides greater agitation. As mentioned, the amount of time that the powder is heated above the Tg is determined by the residence time of the powder within the heating zone. In this regard, the residence time may be determined by the size of the heating zone, the flowrate of the powder therethrough, a particle velocity, and/or a combination thereof. In one approach, the heating zone is between about 2 and about 30 feet and the velocity at which the powder is advanced through the zone is between about 0.1 and about 10 feet/min. The velocity may be adjustable in order to control the residence time. In yet another approach the powder is tumbled or mixed within the heating zone as it is advanced therethrough. Tumbling or mixing the powder as it is advanced through the heating zone provides the additional benefits of further reducing agglomeration and sticking of the powder while also providing uniform heating of the powder within the heating zone. As further discussed, the powder may also include a flow agent to help reduce or prevent particle agglomeration.

Next, the powder is exposed to another rapid thermal differential rate or rate-of-change as it enters the cooling phase in order to quickly decrease 18 the particle temperature as it enters a steady-state continuous cooling zone to lower the temperature of the powder to a cooling temperature. Similar to Step 14 described above, the temperature decrease rate on entry to this cooling phase that the particle is exposed to is relatively large and relatively quick so that the particle is quickly exposed to the cooling temperature rather than subjecting the particle to a lengthy cool down period. In this manner, the powder is quickly exposed to the cooling temperature below the Tg so that the softened rubbery powder is hardened to a rigid glassy state and the pores that had previously been formed during the pressurized cracking step and that had subsequently been fused closed during the heating step decrease the permeability of the powder to the pressurized gas moving into, and more importantly, out of the internal voids effective to entrap pressurized gas in the internal voids of the particles comprising the cooled powder.

More specifically and according to one approach, to provide the large rate of temperature decrease, the powder is quickly advanced from the heating zone to the cooling zone, as described further below. Moving the powder from the heating zone to the cooling zone allows the rapid decrease of rate in temperature by allowing the heating and cooling zones to remain at the continuous, steady state heating and cooling temperatures respectively without requiring additional time that would otherwise be necessary to heat a single processing vessel to a heating temperature and subsequently cooling the processing chamber to a cooling temperature as is required in prior methods. Attempting to cool down the materials forming the prior batch processing chamber can be lengthy due to the need to slowly cool the materials forming the batch vessel to avoid damaging the equipment. The present methods avoid these lengthy and costly cool down periods.

In one approach, the particle is exposed to an environment having a rapid thermal rate-of-change the powder is subjected to upon entry into the cooling zone of at least about −30° C./sec. According to another approach, the rapid thermal rate-of-change the powder is subjected to upon entry to the cooling zone is between about −30 and −300° C./sec. In comparison, it can take up to about 40-60 minutes, or longer, for a typical batch process to cool the large pressure vessel from the heating temperature to the desired cooling temperature.

Turning back to FIG. 1, the powder is then exposed to a continuous steady-state cooling temperature generally shown at step 20 for an amount of time effective to harden the particles containing the fused pores to restrict the hardened particles from expanding to thereby restrict the pressurized gas from exiting the internal voids. In this manner, the pressurized gas becomes substantially entrapped within the internal voids. By one approach, the cooling temperature is about 5 to about 20° C. for about 3 to about 5 minutes. Thus, a relative ratio of heating to cooling times in the continuous system is about 0.2 to about 13 and, in some cases, about 1.2 to about 6, and in yet other cases, about 1.2 to about 4. That is, much less cooling time is needed in the continuous system over the batch system when the methods described herein are applied.

Next, the powder is exposed to a pressure drop at step 22 to equalize the pressure to ambient pressures. Finally, the powder is exposed to the ambient environment. In this manner, because the powder has been previously softened during heating to seal pores, either inherently present or formed by contacting with pressurized gas, and then hardened during cooling to reduce its porosity and permeability to the flow of the gas, the pressurized gas becomes entrapped within the internal voids of the powder. In one approach, the powder is subsequently exposed to a fluid medium, such as for example hot water or cold milk, and the pressurized gas is released and a beverage or food product is formed with enhanced foaming properties.

The method for entrapping pressurized gas in powdered beverage and food products described above, and illustrated in FIG. 1, advantageously provides sufficient pressurized gas entrapment in a shorter amount of time, with less energy consumption, as compared to the prior methods, because the powder is exposed to a rapid increase and decrease in temperature rather than a gradual increase or decrease in temperature as required by the prior methods.

In another approach, a method of continuously manufacturing a foaming particle composition at high pressure involves first adding a particle to a pre-pressurization zone and increasing the pressure to about 20 to about 3100 psi to form a pressurized particle effective to create one of passageways, voids, and a mixture thereof in the particle. Next, the pressurized particle is transferred to a heating zone, which is separate from the pre-pressurization zone. In the heating zone, which may be operated at about 20 to about 3100 psi, the particle is continuously advanced along the heating zone at a rate and for a time effective to increase the temperature of the pressurized particle above its glass-transition temperature to form a heated particle. Then, the heated particle is continuously transitioned from the heating zone through a transition zone that may operate at about 20 to about 3100 psi. The heated particle is then moved from the transition zone to a cooling zone, which is separate from the heating zone and the transition zone. The cooling zone may operate at about 20 to about 3100 psi and continuously advance the heated particle through the cooling zone at a rate and for a time effective to drop the temperature of the heated particle below its glass-transition temperature to form a cooled particle. Once cooled, the particle is moved to a de-pressurization zone, which is separate from the cooling zone, for dropping the pressure from about 20 to about 3100 psi to ambient pressure to form a de-pressurized and cooled particle. Lastly, the de-pressurized and cooled particle is released from the de-pressurization zone to form the foaming particle composition having pressurized entrapped gas remaining therein.

Figure 2:
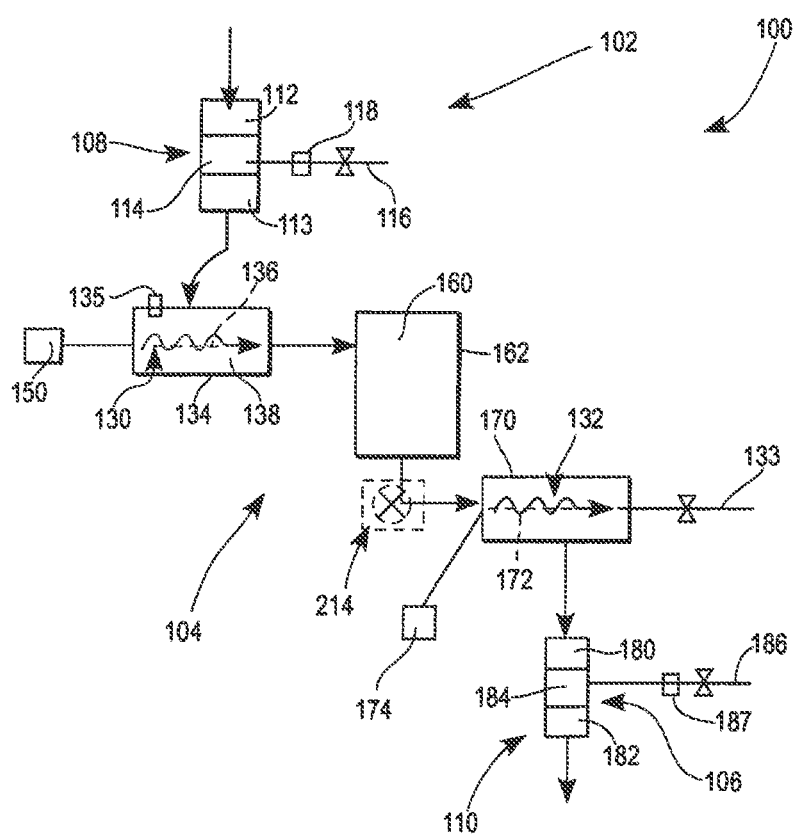
FIG. 2 is a diagrammatic view of a system for continuously entrapping pressurized gas within a powdered or granular beverage or food product.

Turning now to FIG. 2, an exemplary steady-state, gas entrapment system 100 is provided that is suitable for carrying out the above described methods, and capable of entrapping pressurized gas within internal voids of a base powder to form a food or beverage powder having enhanced foaming properties.

In general, the gas entrapment system 100 includes an inlet system 102, a main gas entrapment processing chamber 104, and an outlet system 106. During operation, a base powder is fed into the inlet 102 and transferred into the processing chamber 104 where pressurized gas is entrapped within the internal voids of the powder. The powder is next moved to the outlet 106 where it exits back into the ambient environment. The main processing chamber 104 includes separate, but linked heating and cooling zones 130 and 132, which may operate at steady-state pressures and temperatures. The inlet 102 and outlet 106 substantially seal the main processing chamber 104 from the ambient environment as described further below so that a steady-state elevated pressure may also be maintained within the main processing chamber during operation.

The base powder may include powders with internal voids in which pressurized gas may be entrapped. In one approach, the powders may be pre-treated by spray drying, freeze drying, or by other methods, with gas bubbles injected into a solution to form a powder with internal voids. A flow-aid may be combined with the base powder to provide better flow characteristics of the powder through the gas entrapment system 100 to reduce agglomeration and caking of the powder. The flow aid may be any anticaking agent suitable for use in foods, such as, but not limited to, silicon dioxide, tricalcium phosphate, sodium aluminosilicate, calcium carbonate, and mixtures thereof.

Figure 4:
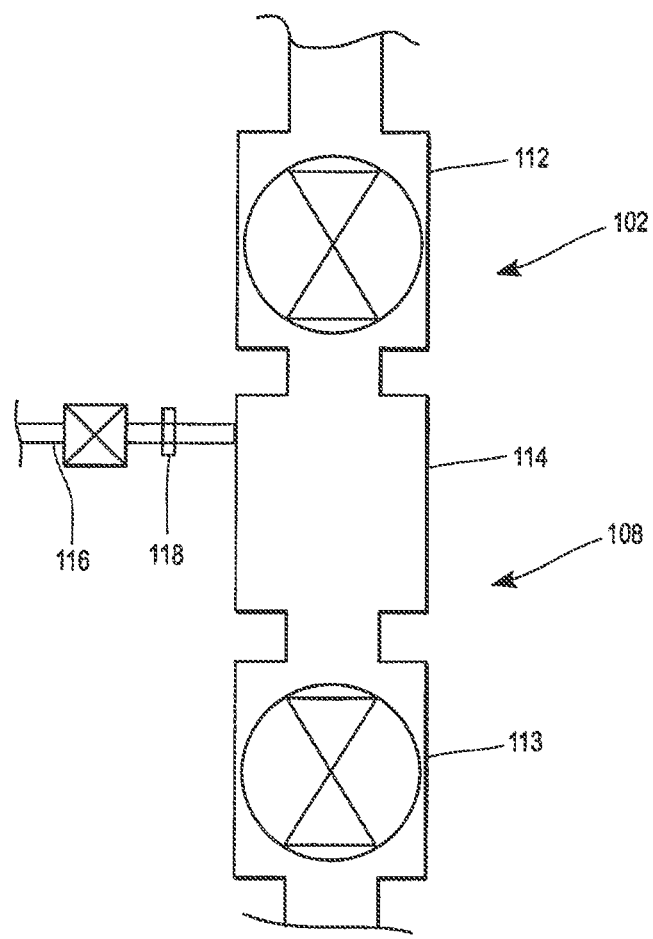
FIG. 4 is a diagrammatic view of an airlock device of the system of FIG. 2.

The inlet 102 and outlet 106 may each includes an airlock system 108 and 110, respectively, shown in FIG. 4, for allowing powder to enter and exit the system while maintaining a generally constant pressure within the main processing chamber 104. The top airlock system 108, according to one approach, includes top and bottom airlock valves 112 and 113, with a powder holding or surge chamber 114 being positioned therebetween. The top and bottom airlock valves 112 and 113 are sequentially movable between open and closed configurations. In the open configuration, they are capable of allowing powder to pass therethrough, but when moved to a closed configuration, the top and bottom airlock valves are substantially hermetically sealed to restrict the flow of gas therethrough. By one approach, the powder holding chamber may range from about 1 liter to about 50 liters in size. The inlet system 102 may also include multiple air lock systems 108 to sequentially dose powder into the main chamber 104.

A pressurized gas supply (not shown) is connected to the powder holding chamber 114 via a supply line or hose 116. In this manner pressurized gas, e.g. nitrogen, carbon dioxide, or other inert gas to be entrapped in the powder, is supplied from the gas supply to the powder holding chamber 114 to pre-pressurize the powder prior to be introduced into the main chamber 104.

A gas exhaust is provided in communication with the powder holding chamber 114 in order to vent pressurized gas therefrom. In one approach, the gas is also exhausted through line 116. By one approach, the pressure in the powder holding chamber 114 may be slowly vented and/or slowly pressurized at about 0.14 psi/sec to about 725 psi/sec such as over a time period of about 30 seconds to about 120 seconds to effectively allow the airlocks to cycle in a continuous manner when the main chamber 104 is running at about 20 to about 3100 psi. If venting and/or pressurizing occur too fast, then the airlocks do not properly dose the powder to the main chamber, they become clogged, and otherwise do not operate efficiently in a continuous system. In one approach, a suitable filter 118 may be provided in the gas supply and/or gas exhaust system to restrict the flow of powder into the supply/exhaust system.

So configured, in order to affect the entry of powder into the pressurized main processing chamber 104, the upper valve 112 is initially moved to the open position with the lower airlock valve 113 in a closed position so that the pressure within the powder holding chamber 114 is equal to ambient pressures. A quantity of base powder is fed through the top airlock valve 112 into the powder holding chamber 114. The top airlock valve 112 is then moved to the closed position. With both the top and bottom airlock valves 112 and 113 in the closed positions, the gas supply 116 supplies pressurized gas into the powder holding chamber 114 to increase the pressure therein to be approximately equal to the operating pressure within the main processing chamber 104. In one approach, the pressure within the powder holding chamber 114 is increased to between about 20 to about 3100 psi. As explained further below, the system 100 may employ gas sharing where pressurized gas from the outlet system 106 is used upon de-pressurization thereof and shared to pressurize the inlet system 102 and, thus, minimizing the gas loss in the system. Alternatively, if the system 100 includes multiple inlet airlock mechanisms 108, gas sharing may be employed between each of the inlet airlocks where de-pressurization of one inlet air lock is used to pressurized another inlet airlock and so forth.

Increased pressure in the powder holding chamber 114 initiates particle cracking of the powder particles, if needed as described previously, to create pores or passageways into the internal voids of the powder so that the pressurized gas may permeate the internal voids. In one approach, in order to withstand the high pressures generated within the powder holding chamber 114 and main processing chamber 104 to which the airlock valves are subjected, the airlock valves 112 and 113 may include ball valves or other rotary valves that are pressure rated to withstand such high pressures.

With the pressure in the powder holding chamber 114 approximately equal to the pressure in the main processing chamber 104, the bottom airlock valve 113 is subsequently opened and the powder is advanced into the main processing chamber 104. In this manner, the top airlock system 108 allows the powder to be fed from the external ambient environment into the pressurized main processing chamber 104 while maintaining an elevated pressure of the main processing chamber 104 relative to the ambient environment. The bottom airlock valve 113 is subsequently closed, so that additional powder may be fed into the system in the same manner. To this end, the pressurized gas remaining in the airlock system 108 is exhausted from the powder holding chamber 114 to return the pressure to be approximately equal to the ambient pressure before additional powder can be added. In one approach, the pressurized gas is also exhausted through the line 116. The airlock system 108 may also include a filtration system or filter 118 to keep the exhaust gas free from the particulates included in the airlocks system 108, which could otherwise block the exhaust system or be exhausted into the external environment. By one approach, the amount of powder fed into the powder holding chamber 114 should be below the height of the pressurized gas supply line 116 and the exhaust system so that the powder does not interfere with the flow of gas into and out of the holding chamber 114.

In another approach, multiple inlet airlock systems may be provided in parallel that separately feed powder into the main processing chamber 104. In some cases, it has been found that pressurizing and exhausting the air lock system 108, as described above, too rapidly can cause the powder material to bridge against the top airlock valve 112, i.e. become densely packed against the top airlock valve, so that some of the powder remains in the powder holding chamber 114 upon opening the bottom airlock valve 113. If the pressurized gas is subsequently exhausted rapidly from the powder holding chamber, the powder becomes aspirated through the exhaust vent where it can form blockages in the venting system or be exhausted into the external environment. In some cases, it may also be possible to have full blockages in the system and then when the top airlock would open a burst of pressure may occur and disrupt the flow of any additional powder that was being dosed in. The airlock systems described herein avoid or minimize such issues. In addition, providing multiple airlock systems 108 pursuant to this alternative approach allows the airlock systems to operate more slowly, particularly exhausting the pressurized gas more slowly from the holding chamber 114, to restrict the bridging and aspiration of powder, while providing an adequate supply of powder into the main processing chamber 104 to attain sufficient processing and throughput requirements. In another approach, a device for disrupting the powder from clumping or bridging in the powder holding chamber 114 may be provided to break up any powder bridging that may occur. In one example, a vibrating device is mounted to the powder holding chamber 114 to break up the powder and restrict clumps or bridges from forming and advance all of the powder into the main processing chamber.

Figure 3:
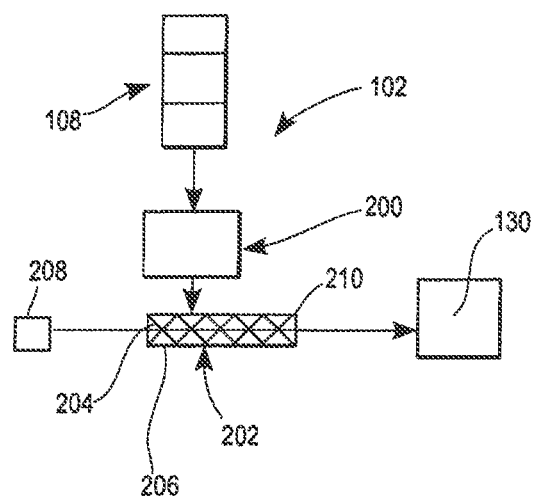
FIG. 3 is a diagrammatic view of a portion of a system for continuously entrapping pressurized gas within a powdered or granular beverage or food product.

In another approach, as illustrated in FIG. 3, the inlet 102 may also includes a buffer chamber 200 and a dosing device 202. The buffer chamber 200 may include a large holding chamber for holding a large quantity of powder under pressure. By one approach, the buffer chamber may be sized to hold a 10 minute residence time of material and, in some approaches, be about 1 to about 150 liters in capacity and, in other approaches, about 50 to about 130 liters in capacity.

By one approach, the buffer chamber allows the powder to be held under the elevated pressure for a time effective to cause sufficient cracking of the powder prior to advancing the powder to the main processing chamber 104. In the holding chamber, the product may crack in less than about 60 seconds. The buffer chamber 200 also allows a large reserve amount of powder to be held within a pressurized portion of the system 100 prior to the main chamber 104 to ensure an adequate supply of powder into the main processing chamber 104 if variations in the amount of powder fed into the air lock system 108 cause the powder supply to become insufficient at any point in time during operation, which may occur for various reasons. In addition, if multiple input airlock devices 108 are incorporated, the buffer chamber 200 provides a single holding chamber from which the powder is fed into the main processing chamber 104 to ensure that a consistent amount of powder is continuously being fed into the main processing chamber 104. In this optional approach, each of the multiple air locks may supply powder to the buffer chamber 200.

As mentioned, the inlet may also include a dosing device 202, positioned below the buffer chamber 200 as illustrated in FIG. 3. By one approach, the dosing device 202 may be a device having a screw or other transport mechanism 204 disposed within a hollow tube 206 that operates at the elevated pressures of the main chamber. The screw or transport mechanism 204 is driven by a suitable motor 208 and includes threads or other devices for advancing or for driving the powder along the inner chamber 210 of the hollow tube 206. The dosing device 202 ensures that a regulated and consistent volume of powder is dosed into the main processing chamber on a continuous basis. The dosing device can be operated by means of a variable speed drive motor whereby the powder rate can be altered either manually or automatically on a continuous basis.

The main processing chamber 104 includes separate, but linked high pressure heating and cooling zones 130 and 132, respectively. In one approach, the heating zone 130 is heated to a temperature above the Tg of the powder prior to operation of the system and introduction of the powder into the heating zone 130, and is maintained at this heating temperature at steady state conditions during operation. Similarly, the cooling zone 132, as described below, is set to a cooling temperature prior to operation or introduction of the powder and is maintained at the cooling temperature at steady state-conditions. In this manner, the separate heating and cooling zones 130 and 132 can be set to steady-state operating temperatures and maintained at these temperatures during operation of the gas entrapment system 100 rather than gradually heating and subsequently gradually cooling a single vessel during the gas pressurization process as was required in prior methods.

The main processing chamber 104 also includes a pressurized gas supply for providing pressurized gas within the main processing chamber to be entrapped within the internal voids of the powder. The gas may be supplied into the main processing chamber through supply hose or line 133. In one approach, the heating zone 130 and the cooling zone 132 are in communication with each other, for example through transition zone 160, so that a single pressure supply may provide pressurized gas to both the heating zone 130 and the cooling zone 132. In this manner, the pressurized gas consumption may be shared between the heating zone 130 and the cooling zone 132, and a steady-state pressure may be maintained in both the heating zone 130 and the cooling zone 132 so that the main processing chamber 104 does not have to be de-pressurized and re-pressurized during operation, reducing the amount of pressurized gas required during operation. By one approach, the pressurized gas supply line 133 is provided at the end of the cooling zone 132.

The transition zone 160 links and also effective to form two distinct temperature zones to limit and, in some cases, prevent thermal migration between the zones. The transition zone may be a physical separation, such as a valve, gasket, wall, or the like, or the transition zone may be a drop zone where the heating zone is positioned above the cooling zone where the particulate is required to drop via gravity through an open passageway to traverse from, one zone to the other.

It has been found that for various reasons, including the temperature gradient formed between the heating and cooling zones 130 and 132, moisture can form within the main processing chamber, causing agglomeration and sticking of the powder within the chamber. Thus, in one approach, a pressurized gas vent 135 may be provided at the inlet of the heating zone 130 to provide a gas flush through the main processing chamber to remove moisture buildup. In another approach, pressurized gas can be supplied separately to the heating zone 130 and the cooling zone 132, and the heating zone 130 and the cooling zone 132 may be generally sealed from each other to restrict the flow of pressurized gas therebetween. The pressure within the heating and cooling zones 130 and 132 is effective to provide and maintain particle cracking of the powder for movement of the pressurized gas into the internal voids of the powder. In one approach the steady-state operating pressure within the heating and cooling zones 130 and 132 is about 20 to about 3100 psi as mentioned above.

The heating zone 130 generally includes an elongated chamber under elevated temperatures and pressures through which the powder is advanced. In one approach, the heating zone 130 includes an elongated hollow tube or pipe 134 with a screw or auger 136 rotatably mounted therein for driving the powder through the heating zone 130. The hollow tube 134 may be formed of a heat conducting material, such as metal material, and a resistive heating element, e.g., a heating jacket, or other suitable heating devices, may be positioned around the outer surface of the elongated tube to heat the tube along the length thereof to the heating temperature. In this manner, heat is conducted to the inner surface of the elongated tube for heating the powder advancing therethough. A control system, including a temperature sensor system, (not shown) may be provided for sensing the temperature within the hollow tube 134 and maintaining the temperature within the heated tube at the heating temperature. In this manner, the heating zone 130 can be maintained at a steady-state heating temperature above the Tg of the powder as the powder is advanced into and through the heating zone 130 to provide rapid increase in the temperature of the powder above the Tg. In this manner, in one approach the temperature of the powder may be monitored and controlled to above the Tg. In one approach, the heating zone is heated to and maintained at a steady-state temperature between about 90 and about 150° C. In other approaches, the process can take place at ambient temperature.

The elongated screw 136 is housed within the hollow tube 134 and includes an elongated shaft with external threading formed thereabout so that rotation of the screw causes the threads to drive the powder through the hollow tube 134 at a powder velocity. In one approach, the threads 138 are sized so that the screw 136 fits relatively tightly within the hollow tube 134 so that there is a close clearance with the inner tube wall. Thus, with the threads 138 closely adjacent to the tube walls, the threads restrict the powder from sticking to the tube walls so that it is continuously advanced through the hollow tube 134 and does not build up along the inner surfaces of the tube which could otherwise cause blockages and ultimate seizing of the screw 136. In one approach, adjustable paddles, baffles, and/or scrapers (not shown) may also be mounted to the shaft to provide additional mixing and tumbling of the powder within the hollow tube 134 and scraping and removal of any powder buildup along the tube inner surface. To this end, the powder may experience both an axial and a radial velocity as it is pushed through the heating zone. This can reduce the amount of agglomeration of the powder in the heating zone 130, scrape powder that may become melted or caked on the hollow tube inner surface, and tumble the powder to provide more uniform heat distribution thereto as it is advanced through the heating zone 130.

The heating screw 136 may be rotatably driven by a suitable motor 150 positioned at an end thereof for driving the powder through the heating zone 130. To restrict agglomeration of the powder and seizing of the screw, in one approach the powder is dosed into the heating chamber and moved therethrough at a rate effective to maintain the powder at a level below about half of the height of the hollow center of the hollow tube 134. The motor 150 may be a variable speed motor that is controllable to operate the screw 136 at varying rotational velocities to vary the flowrate of the powder through the heating zone 130. In this manner, the residence time during which the powder remains in the heating zone 130, and is thus heated above the Tg, may be carefully controlled based on the length of the heating zone and the velocity at which the screw 136 advances the powder through the heating zone 130.

The geometry of the screw 136 can also affect the velocity of the powder through the heating zone 130. It has been found, that increasing the residence time of the powder within the heating zone above a certain threshold does not provide additional gas entrapment within the powder. Therefore, controlling the speed of the motor 150 allows the user to select the residence time to provide sufficient gas entrapment within the powder while minimizing the dwell time within the heating zone, thereby increasing the throughput of the system 100. The residence time will depend on several parameters including, but not limited to, the type of powder, the temperature in the heating chamber, and the moisture level of the powder. In one approach, the residence time within the heating zone 130 is between about 1 min and 80 min, in another approach, about 1 to about 40 minutes, and in yet another approach, about 6 to about 20 minutes.

In addition, because the heating zone 130 is maintained at a steady-state heating temperature, as the powder is fed from the powder holding chamber 114 into the heating zone 130, the temperature at which the powder is exposed increases rapidly as the powder moves from the holding chamber 114, which is at generally ambient temperatures, to the heating zone, which is maintained at the steady-state heating temperature. In this regard, additional time is not required to preheat the heating zone 130 to the heating temperature as was required in prior methods. In one approach, as mentioned previously, the change in temperature to which the powder is exposed during movement from the powder holding chamber 114 to the heating zone 130 is between about 30° C./s to 300° C./s. In another approach, a heating device may be included within the screw 136 to provide additional heat to the powder through the screw to affect faster heating times thereof. In addition, including a heating device within the screw 136 may provide more uniform heating of the powder by providing additional conductive heating surfaces for the powder to contact.

The heat input required for the continuous systems herein is about 50 to about 80 percent lower than a batch system. By one approach, the heat input is the heat required to heat the powder plus the heat required to heat the equipment plus the heat required to heat the gas during operation and start-up and any heat losses. In some approaches, the heat input per kilogram of powder is about 200 to about 400 kJ/kg of powder. This may vary depending on the powder and application.

After passing through the heating zone 130, the powder is advanced through the transition zone 160 into the cooling zone 132. In one approach, as illustrated in FIG. 2, the cooling zone 132 is positioned vertically below the heating zone 130. In this approach, the transition zone 160 may include a hollow tube 162 in communication with both the heating zone 130 and the cooling zone 132. The hollow tube 162 is oriented vertically so that as the powder is advanced to the end of the heating zone 130, it drops or falls by the force of gravity through the hollow tube 162 directly into the cooling zone 132. In some cases, the length of time it takes the particle to fall from the upper heating zone to the lower cooling may be about 2 seconds or less, and in other cases, about 0.5 to about 1 second.

In addition, because the hollow tube 162 maintains the heating and cooling zones 130 and 132 in communication with one another, the single pressurized gas source 135 can supply pressurized gas to both the heating and cooling zones 130 and 132, as mentioned previously, to reduce the overall pressurized gas consumption and to minimize having to pressurize and de-pressurize the main processing chamber.

In another approach, as illustrated in FIG. 2, a rotary valve 214 above the transition device may optionally be positioned in the transition area 160 between the heating zone 130 and the cooling zone 132. The rotary valve 214 may be included to ensure that there is an even transfer of powder between the sections and the smooth handling of the powder. The rotary valve also acts as a physical separation between the heating zone and the cooling zone to further reduce the amount of heat transfer between these two zones. The rotary valve is included in the transition zone 160; the valve may be heated to restrict condensation developing at the transition due to the steep temperature profile between the heating and cooling zones which could otherwise result in bridging of the powder and blocking of the powder at this point. The rotary valve 214 may also be included at the end of the heating zone 130 to transition to the transition zone.

The powder is advanced through the transition zone 160 into the cooling zone 132. The cooling zone 132 is constructed similarly to the heating zone 130 described above, and generally includes an elongated chamber that is maintained at a cooling temperature through which the powder is advanced. In one approach, as illustrated in FIG. 2, the cooling zone 130 includes an elongated hollow tube 170 with an elongated screw or auger 172, as described above with regard to the hating zone screw 136, mounted therein for rotational movement. A motor 174 is configured to rotatably drive the screw 172 to advance the powder through the cooling zone as described above with regard to the heating screw 136. In other approaches, other suitable transport means or conveyors may be used to advance the powder.

The cooling zone may be cooled by running cooling water or other coolant along the outer surface of the hollow tube 170. In this manner, as described above in regard to the heating zone 130, the cooling zone 132 may be maintained at a steady-state cooling temperature below the glass transition temperature Tg of the powder. As the powder is advanced through the cooling zone 132 it is cooled through a conductive cooling by contact with the inner surface of the hollow tube 170. To this end, the hollow tube may be formed of a heat conductive material, for example, metal or other material, to maximize the heat transfer from the powder and cooling thereof to below the Tg of the powder.

In one approach, the cooling zone is maintained at a steady-state temperature of between about 5 and 20° C. As mentioned previously, the cooling zone is maintained at an elevated operating pressure. The operating pressure may be at or near the operating pressure of the heating zone 130. Maintaining the operating pressure of the cooling zone 132 at the elevated operating pressure allows the powder to be hardened in the cooling zone 132 prior to being exposed to lower pressures to decrease the permeability of the powder so that the gas remains entrapped within the internal voids of the powder at an elevated pressure when the pressure is finally reduced.

The residence time in the cooling zone is effective to provide hardening of the powder particles sufficient to prevent particle expansion, when exposed to the subsequent pressure drop, effective to prevent escape of pressurized gas from the internal voids. The residence time that the powder is maintained in the cooling zone may be shorter than the residence time in the heating chamber 130 because there are not as many concerns with the powder agglomerating or sticking in the cooling chamber. In one approach, the powder is cooled as rapidly as possible in the cooling chamber 132 to below the Tg of the powder to harden the powder, and thus has a relatively short residence time, increasing the throughput of the gas entrapment system 100. In one approach the residence time that the powder remains in the cooling zone 132 is between about 1 min and 10 min.

Although, as illustrated in FIG. 2, the cooling zone 132 is positioned below the heating zone 130, other configurations of the heating zone 130 and cooling zone 132 relative to one another are contemplated herein. For example, the heating and cooling zones may include a single elongated hollow tube with a single elongated rotatable screw extending through both zones for advancing the powder therethrough. In this approach, separate heating and cooling zones can be formed along the same single hollow tube in a longitudinal arrangement by heating an upstream portion of the hollow tube while cooling a downstream portion of the hollow tube in the manners described previously. The configuration as illustrated in FIG. 2 may be advantageous, however, because the separation between the cooling and heating zones 132 and 130 reduces the heat transfer between the heating and cooling zones. Separate heating and cooling zones can be beneficial, however, because they can restrict the formation of a large temperature gradient therebetween which could otherwise create thermal stresses and strains within the tube material.

The cooling input required for the continuous systems herein is also about 50 to about 80 percent lower than a batch system. By one approach, the cooling input is the energy required to cool the powder plus the cooling required to cool the equipment plus the cooling required to cool the gas during operation and start-up and any heat losses. In some approaches, the cooling input per kilogram of powder is about 200 to about 350 kJ/kg of powder. This may vary depending on the powder and application.

Upon reaching the end of the cooling zone 132 the powder is advanced to the outlet 106. The outlet may include a bottom airlock system 110 similar in construction to the upper airlock system 108 described previously. The bottom airlock system 110, as illustrated in FIG. 2 includes top and bottom airlock valves 180 and 182 and a powder holding chamber 184 positioned therebetween. Upon transition of the powder from the cooling zone 132 to the outlet 106, the top and bottom airlock valves 180 and 182 are initially positioned in a closed position. With the valves in a closed position, the gas supply may supply pressurized gas to the powder holding chamber 184 through gas supply pipe 186 to increase the pressure within the powder holding chamber 184 to approximately equal to the pressure within the main processing chamber 104. The top airlock valve 180 is then opened to allow the powder to advance therethrough into the powder holding chamber 184. Next, the top airlock valve is closed and the pressurized gas within the powder holding chamber 184 is exhausted through the gas supply pipe 186 until the pressure within the chamber 184 is approximately equal to the ambient pressure (as mentioned further below, exhausting or venting of chamber 184 may be coupled to or share gas with the inlet air lock system). As with the top airlock device 108, the bottom airlock device may include a filter 187 for restricting the flow of powder from the powder holding chamber 184 through the supply line 186. The bottom airlock valve 182 is then opened to allow the powder to exit the powder holding chamber 184 and enter the external environment where it may be collected for packaging or further processing.

Figure 5:
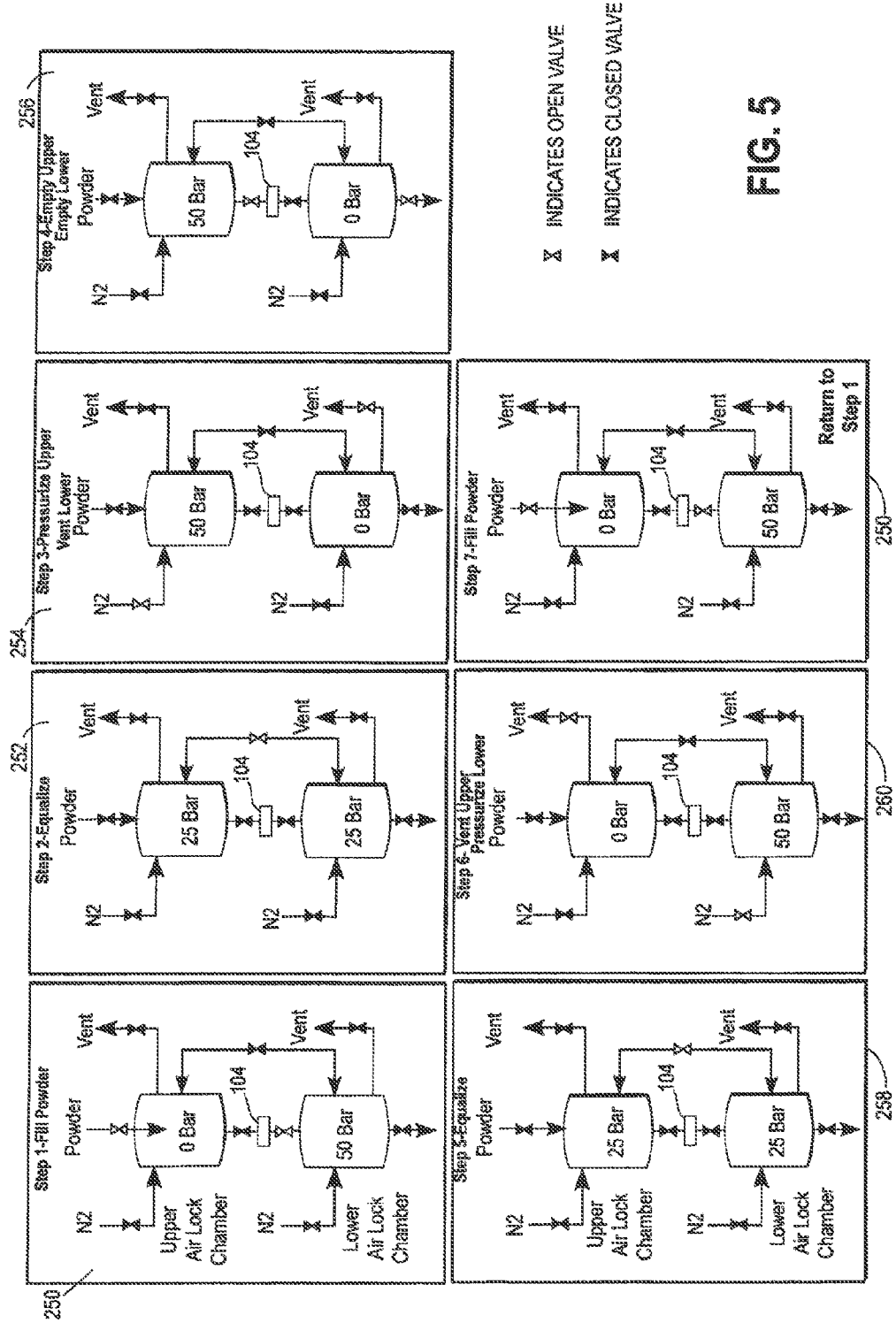
FIG. 5 is a diagrammatic view of the upper and lower air lock devices illustrating the sequence of steps for filling and emptying the upper and lower air lock devices with powder.

In one approach, illustrated in FIG. 5, a pressurized gas-sharing arrangement between the inlet and outlet air locks 108 and 110 is shown so that pressurized gas may be shared between the upper and lower airlock systems to conserve pressurized gas and reduce the amount of pressurized gas consumption required during operation. In a first step, with the upper air lock device 108 at ambient pressure and the lower airlock device 110 at operating pressure, new powder is fed into the upper air lock system 108 and processed powder with entrapped pressurized gas is transferred from the main processing chamber 104 into the lower air lock system 110 as represented in step 250. Next, the pressure between the upper and lower airlock systems 108 and 110 is equalized at step 252 by venting gas from the lower airlock system 110 into the upper airlock system 108. The upper airlock system 110 is then pressurized to operation pressures and the lower airlock system is vented to approximately ambient pressure at step 254. Next, the powder from the upper airlock device 108 is fed into the main processing chamber 104 and the powder in the lower airlock system 110 is released into the external environment at step 256.

The pressures in the two airlock systems 108 and 110 are again equalized in step 258 by venting pressurized gas from the upper airlock system 108 to the lower airlock system 110. Next, the upper airlock system 108 is vented to return to approximately ambient pressures and the lower airlock system 110 is pressurized to approximately operation pressures in step 260. With the upper and lower systems in the same pressurized state as in initial step 250, the process can be repeated and additional powder can be fed into the upper airlock system 108 and from the main processing chamber 104 into the lower airlock system 108. This sequential gas sharing and opening and closing of the inlet and outlet airlocks continues to repeat throughout the process.

In this manner, the timing of powder being fed into the upper airlock system 108 and from the lower airlock system 110 is synchronized along with the pressurization and de-pressurization up the upper and lower airlock systems so that pressurized gas may be shared between the upper and lower airlock systems. In another approach, if multiple upper airlock systems 108 or lower airlock system 110 are used in parallel as described previously, they may be synchronized similar to the synchronization between the upper and lower airlock systems described above, so that pressurized gas may be vented therebetween. In this manner, the pressurized gas may be recycled to reduce the consumption of pressurized gas required to operate the gas entrapment system 100 providing cost savings and environmental benefits.

In another approach, one or both of the heating zone 130 and the cooling zone 132 may have zoned temperature control to provide a continuous or a variable temperature across the heating zone. To this end, the heating zone 130 may include a plurality of heating devices positioned along the length thereof. The heating devices may be controlled individually to avoid temperature variations along the length of the heating zone 130, which may otherwise occur in a single, elongated heating device. Similarly, the cooling zone may include a plurality of cooling devices positioned along the length of the cooling zone 132, which may be separately controlled to avoid temperature variations. Alternatively, if a plurality of heating zones or cooling zones is provided in the heating zone 130 or cooling zone 132, a specific temperature profile may be formed along the lengths thereof to maximize the heating and cooling of the powder as it advances therethrough.

The above methods and systems may be used to form foaming compositions from powders, granules, and/or particulate and/or powders, granules, and/or particulates that contain high pressure gas, as further described in U.S. Pat. Nos. 7,534,461; 7,713,565; 7,736,683; 6,168,819; and 5,721,003; and WO2006/023565.

In one aspect, a method of continuously manufacturing a foaming particle composition at high pressure is provided. The method comprising: adding a particle to a pre-pressurization zone and increasing the pressure to about 20 to about 3100 psi to form a pressurized particle effective to create one of passageways, voids, and a mixture thereof in the particle; transferring the pressurized particle to a heating zone, separate from the pre-pressurization zone, wherein the heating zone is operating at about 20 to about 3100 psi and continuously advancing the pressurized particle along the heating zone at a rate and for a time effective to increase the temperature of the pressurized particle above its glass-transition temperature to form a heated particle; continuously transitioning the heated particle from the heating zone through a transition zone operating at about 20 to about 3100 psi; transferring the heated particle from the transition zone to a cooling zone, separate from the heating zone and the transition zone, the cooling zone operating at about 20 to about 3100 psi and continuously advancing the heated particle through the cooling zone at a rate and for a time effective to drop the temperature of the heated particle below its glass-transition temperature to form a cooled particle; moving the cooled particle to a de-pressurization zone, separate from the cooling zone, for dropping the pressure from about 20 to about 3100 psi to ambient pressure to form a depressurized and cooled particle; and releasing the depressurized and cooled particle from the depressurization zone to form the foaming particle composition having pressurized entrapped gas remaining therein.

The method may also include wherein transferring the pressurized particle to the heating zone exposes the pressurized particle to a thermal differential rate of about 30° C./second to about 300° C./second between the pre-pressurization zone and the heating zone.

The method may also include wherein transferring the heated particle from the heating zone to the cooling zone exposes the heated particle to a thermal differential rate of about −30'C/second to about −300° C./second between the heating zone and the cooling zone.

The method may also include wherein the transition zone between the heating zone and the cooling zone includes a free falling zone where the heated particle falls under gravity between the heating zone and the cooling zone.

The method may also include wherein the pre-pressurization zone is in gas communication with the depressurization zone so that gas sharing occurs therebewen where gas from the de-pressurization zone is utilized to pressurize the pre-pressurization zone such that de-pressurization is synchronized with pre-pressurization.

The method may also include wherein the pre-pressurized zone is pressurized with gas from the depressurization zone at a rate of about 0.14 psi/second to about 725 psi/second.

The method may also include wherein venting of one or more of the pre-pressurization zone and the de-pressurization zone occurs over about 30 seconds to about 120 seconds.

The method may also include wherein, the pre-pressurization zone includes air locks at an entrance and an exit thereof and an associated particle surge chamber at a pressure of about 20 to about 3100 psi, the particle surge chamber sized to hold a quantity of particles during pre-pressurization effective so that heating zone has a continuous supply of particles therein.

The method may also include wherein the air lock at the entrance to the pre-pressurization zone is configured to operate sequentially with the air lock at the exit of the pre-pressurization zone.

The method may also include wherein the particle surge chamber has a capacity sized to hold about a 5 minute to 15 minute residence time of particles.

The material may also include wherein the particle surge chamber has a capacity of about 1 to about 150 liters.

The method may also include wherein the de-pressurization zone includes air-locks at an entrance and an exit thereof with the particle surge chamber therebetween sized to hold a quantity of particles during de-pressurization.

The method may also include wherein each of the air-locks is a rotary valve configured to withstand pressures of about 20 to about 3100 psi.

The method may also include further comprising more than one air lock at the entrance or exit of the pre-pressurization zone or the de-pressurization zone effective to maintain continuous operation of the heating and cooling zones.

The method may also include further comprising a continuously operating dosing device between the exit of the pre-pressurization zone and an entrance to the heating zone.

The method of may also include wherein a total heat input per kg of particle in the heating zone is about 200 to about 400 KJ/Kg.

The method may also include wherein the residence time in the heating zone is about 1 to about 40 minutes, and preferably, about 6 to about 20 minutes.

The method may also include wherein a ratio of the residence time in the heating zone to the cooling zone is about 0.2 to about 13, preferably about 1.2 to about 6, and more preferably, about 1.2 to about 4.

Advantages and embodiments of the systems and methods described herein are further illustrated by the following Examples. However, the particular conditions, processing schemes, materials, and amounts thereof recited in these Examples, as well as other conditions and details, should not be construed to unduly limit this method. All percentages are by weight unless otherwise indicated.

EXAMPLES

Each of the following examples was performed using a prototype gas entrapment system as generally described previously, having two-inch diameter piping with separate five-foot long heating and cooling zones containing close-clearance augers for driving the powder. Pressurized nitrogen gas sourced from cylinders was used as the pressurized gas. The overall results of the examples are shown in the Table 1 below and further details of the individual examples are provided below. The entrapped gas content of each processed powder was measured by contacting about 3 grams of the processed powder with about 50 nil of room temperature tap water in a closed glass Chittick apparatus, recording the resulting volumetric displacement of the water-filled Chittick reference burette at atmospheric pressure to obtain the volume of gas released by the powder, and then dividing the volume (ml) of gas released by the weight of the powder (g) to express entrapped gas content in units of ml/g.

TABLE 1

| | Base Powder | Status | High Gas Entrapment | Processed Powder Appearance | Processing Issues |
|---|---|---|---|---|---|
| A | SD with flow aid | High gas entrapment, quality met or exceeded target levels | Yes 10-15 ml/g target, up to about 12 ml/g achieved | Good | None |
| B | SD without flow-aid | High gas entrapment, agglomeration difficulties | Yes 10-15 ml/g target, about 11 ml/g achieved | Ok | Some |
| C | PD with flow-aid | High gas entrapment, some sticking in unit | Yes About 9 ml/g achieved | Good | Some |
| D | Carb with flow-aid | High gas entrapment, agglomeration | Yes About 19 ml/g achieved | Ok | Some |

SD = Spray dried coffee powder
FD = Freeze dried coffee powder
Carb = carbohydrate powder including maltodextrin and modified starch Example 1

A spray dried ("SD") coffee powder including particles with internal voids was used as the base powder as generally set forth in row A of Table 1. The coffee powder had low moisture content (below about 2% by mass). The coffee powder was mixed with about 4.5% $SiO_2$ by mass to act as a flow aid during the process. A continuous system as described herein was pressurized with pressurized nitrogen gas to approximately 50 bar and allowed to reach steady state.

Figure 6:
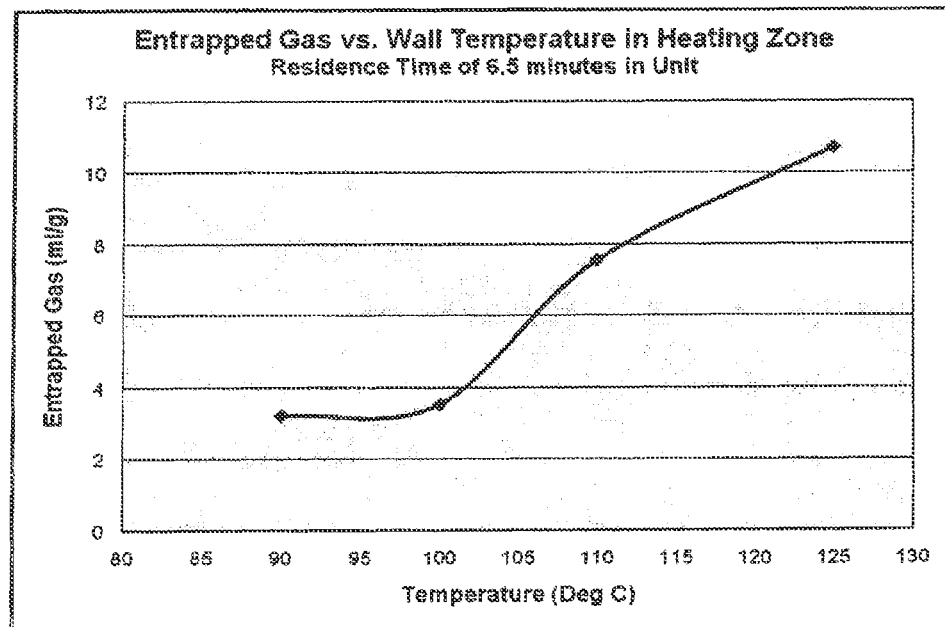
FIG. 6 is a graph showing entrapped gas relative to temperature.

In this Example, a total residence time of about 6.5 minutes with about 3.25 minutes in the hot zone and about 3.25 minutes in the cool zone was used at a variety of wall temperatures to determine how much gas could be entrapped in the coffee powder. The screw speeds in the heating zone and the cooling zone were each about 10 RPMs. The results are shown in the graph of FIG. 6. It was found that at about 125° C. wall temperature, over about 10 ml (at room temperature) of pressurized gas could be entrapped per gram of coffee powder. When the powder exited the system, audible popping and cracking sounds were heard as some particles comprising the processed coffee powder exploded under the force of the pressure drop This is a common occurrence in both the practice of these methods and in prior art batch methods. The powder released gas and formed a foam layer when reconstituted in hot water.

It was also found during this experiment that with residence times above about 6.5 minutes at the higher temperatures (above about 120° C.) significant powder agglomeration occurred. In this example, with operation temperatures above about 130° C., the coffee powder became molten and did not successfully entrap gas due to loss of internal voids caused by melting. In fact, above about 130° C. the coffee powder melted to the walls of the device and seized the auger within the heating zone. In all cases, temperatures above the Tg (about 50° C.) of the coffee powder were used, but heating to temperatures too high above Tg caused melting or partial melting of the coffee particles and reduced the amount of gas that could be entrapped. There was no time needed to cycle the vessel conditions, as is required in prior art batch processes, since the system was constructed to provide separate heating and cooling zones. The coffee powder simply flowed through the system and experienced the temperature cycle while the system remained under steady state.

Example 2

A spray dried ("SD") coffee powder including particles with internal voids was used as the base powder and processed with the prototype system as described herein as also generally set forth in row A of Table 1. The coffee powder had low moisture content (below about 3% by mass) and Tg of about 50° C. The coffee powder was mixed with about 4.5% SiO2 by mass to act as a flow-aid during the process. The system was pressurized with pressurized nitrogen gas to about 60 bar and allowed to reach steady-state. It was found that about 105° C. wall temperature minimized coffee powder agglomeration with good pressurized gas entrapment.

Figure 7:
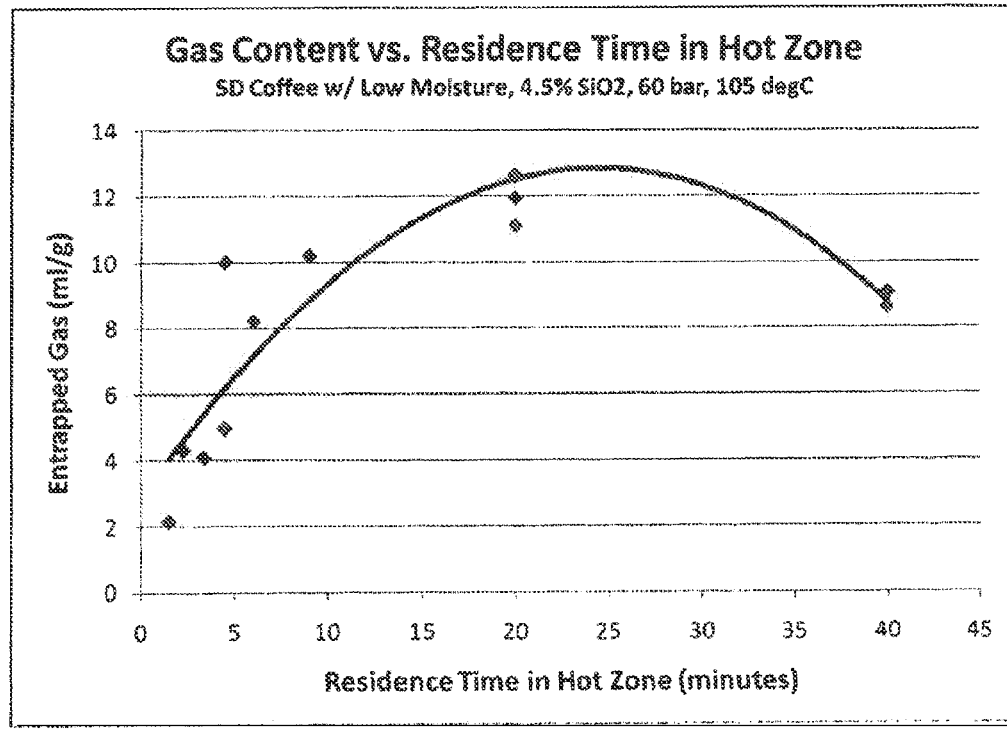
FIG. 7 is a graph showing entrapped gas relative to residence time.

In this Example, an evaluation was completed for various heat zone residence times at about 105° C. wall temperature to find suitable residence times, and the apparent effective residence time, for the coffee powder. The results are illustrated in the chart of FIG. 7. It can be seen from the chart of FIG. 7 that suitable hot zone residence times ranged from about 2 to 40 minutes, or longer, and that the apparent effective residence time was around 20 to 25 minutes with about 20 minutes being most effective for the coffee powder subjected to pressurized gas loading in the system in this instance. It was also found that above about 40 minutes of residence time in the heating zone the processed coffee powder agglomeration was severe in this example at about 105° C. Residence time in the cooling zone was about 3 to 5 minutes with a screw speed of about 8 to 12 RPM. Heating zone screw speed varied from about 1 to 10 RPM to deliver the required residence time.

Example 3

A spray dried carbohydrate powder ("Carb") including maltodextrin and modified starch and comprising particles with internal voids was used as the base powder and processed with the prototype system as described herein after mixing with about 4.5% SiO2 by mass to act as a flow-aid during the process as generally set forth in row D of Table 1. The carbohydrate powder had low moisture content (below about 3% by mass) and Tg of about 100° C. The carbohydrate powder was pressurized with pressurized nitrogen gas and processed through the system in a continuous manner. The hot zone wall temperature was about 145° C. with residence time in the hot zone of about 20 minutes. The operating gas pressure during the test was about 60 bar. A processed carbohydrate powder with about 19 ml (at room temperature) of entrapped pressurized gas per gram of powder was produced. This processed carbohydrate powder had some agglomeration and active gas release (particle explosions). When reconstituted in water a frothy layer was produced on top of the water and the processed carbohydrate powder popped when contacted with the water.

Residence time of the carbohydrate powder in the heating zone was about 20 minutes with a screw speed of about 1.5 to about 4 RPM. The residence time in the cooling zone was about 3 to about 5 minutes with a screw speed of about 10 RPM.

Example 4

In another Example, gas entrapment in a spray dried coffee powder was about 11.9 ml/g when not combined with any flow aid as generally set forth in row B of Table 1. In this Example, the heating zone was about 110° C. The speed in the heating zone was about 1.5 to about 3 RPM giving a residence time of about 40 minutes. In the cooling zone, speed was about 4 to 8 RPM giving a residence time of about 5 minutes. The cooling zone wall temperature was about 10° C.

Example 5

A freeze dried ("FD") coffee powder including particles with internal voids was used as the base powder and processed with the prototype system as generally set forth in row C of Table 1. The coffee powder had low moisture content (below about 2% by mass) and Tg of about 60° C. The coffee powder was pressurized with pressurized nitrogen gas and processed through the system in a continuous manner. The hot zone wall temperature was about 105° C. with residence time in the hot zone of about 20 minutes. The operating gas pressure during the test was about 60 bar. A processed coffee powder with about 8.8 ml (at room temperature) of entrapped pressurized gas per gram of powder was produced. The processed freeze dried coffee powder had very active gas release (particle explosions) when reconstituted in hot water and produced relatively large foam bubbles in water when compared to the processed spray dried coffees with entrapped gas of Examples 1 and 2.

While there have been illustrated and described particular embodiments of the present methods and systems, it will be appreciated that numerous changes and modifications will occur to those skilled in the art, and it is intended in the appended claims to cover all those changes and modifications that fall within the true sprit and scope of the present methods.

What is claimed is:

1. A method of continuously manufacturing a foaming particle composition at high gas pressure, the method comprising:
    adding particles to a pre-pressurization zone and increasing the gas pressure to about 20 to about 3100 psi to form pressurized particles effective to create one of passageways, cracks, or pores, and a mixture thereof in the particles;
    transferring the pressurized particles to a heating zone, separate from the pre-pressurization zone, wherein the heating zone is operating at about 20 to about 3100 psi gas pressure and continuously advancing the pressurized particles, via an auger or continuous screw mechanism, along the heating zone at a rate and for a time effective to increase the temperature of the pressurized particles above the glass-transition temperature of the particles to form heated particles, wherein the auger or continuous screw mechanism agitates the particles while advancing the particles;
    continuously transitioning the heated particles from the heating zone through a transition zone operating at about 20 to about 3100 psi gas pressure;
    transferring the heated particles from the transition zone to a cooling zone, separate from the heating zone and the transition zone, the cooling zone operating at about 20 to about 3100 psi gas pressure and continuously advancing the heated particles through the cooling zone at a rate and for a time effective to drop the temperature of the heated particles below the glass-transition temperature of the particles to form a cooled particle;

moving the cooled particles to a de-pressurization zone, separate from the cooling zone, for dropping the gas pressure from about 20 to about 3100 psi to ambient pressure to form de-pressurized and cooled particles; and releasing the de-pressurized and cooled particles from the de-pressurization zone to form the foaming particle composition having pressurized entrapped gas remaining therein, wherein the pre-pressurization zone is in gas communication with the de-pressurization zone so that gas sharing occurs therebetween where gas from the de-pressurization zone is utilized to pressurize the pre-pressurization zone such that de-pressurization is synchronized with pre-pressurization.

2. The method of claim 1, wherein transferring the pressurized particles to the heating zone exposes the pressurized particles to a thermal differential rate of about 30° C./second to about 300° C./second between the pre-pressurization zone and the heating zone.

3. The method of claim 1, wherein transferring the heated particles from the heating zone to the cooling zone exposes the heated particles to a thermal differential rate of about −30° C./second to about −300° C./second between the heating zone and the cooling zone.

4. The method of claim 1, wherein the transition zone between the heating zone and the cooling zone includes a free falling zone where the heated particles fall under gravity between the heating zone and the cooling zone.

5. The method of claim 1, wherein the pre-pressurized zone is pressurized with gas from the de-pressurization zone at a rate of about 0.14 psi/second to about 725 psi/second.

6. The method of claim 1, wherein venting of one or more of the pre-pressurization zone and the de-pressurization zone occurs over about 30 seconds to about 120 seconds.

7. The method of claim 1, wherein the pre-pressurization zone includes air locks at an entrance and an exit thereof and an associated particle surge chamber at a gas pressure of about 20 to about 3100 psi, the particle surge chamber sized to hold a quantity of particles during pre-pressurization effective so that heating zone has a continuous supply of particles therein.

8. The method of claim 7, wherein the air lock at the entrance to the pre-pressurization zone is configured to operate sequentially with the air lock at the exit of the pre-pressurization zone.

9. The method of claim 7, wherein the particle surge chamber has a capacity sized to hold about a 5 minute to 15 minute residence time of particles.

10. The method of claim 7, wherein the particle surge chamber has a capacity of about 1 to about 150 liters.

11. The method of claim 7, wherein the de-pressurization zone includes air locks at an entrance and an exit thereof with the particle surge chamber therebetween sized to hold a quantity of particles during de-pressurization.

12. The method of claim 11, wherein each of the air locks is a rotary valve configured to withstand gas pressures of about 20 to about 3100 psi.

13. The method of claim 11, further comprising more than one air lock at the entrance or exit of at least one of the pre-pressurization zone and the de-pressurization zone effective to maintain continuous operation of the heating and cooling zones.

14. The method of claim 1, further comprising a continuously operating dosing device between an exit of the pre-pressurization zone and an entrance to the heating zone.

15. The method of claim 1, wherein a total heat input per kg of particle in the heating zone is about 200 to about 400 KJ/Kg.

16. The method of claim 1, wherein a total energy input per kg of particle in the cooling zone is about 200 to about 350 kJ/kg.

17. The method of claim 1, wherein the residence time in the heating zone is about 1 to about 40 minutes.

18. The method of claim 1, wherein a ratio of the residence time in the heating zone to the cooling zone is about 0.2 to about 13.

19. The method of claim 1, wherein a maximum gas entrapment is obtained with a residence time in the heating zone from about 15 to about 30 minutes at temperatures of about 120° C. or less.

* * * * *